Figure 1:
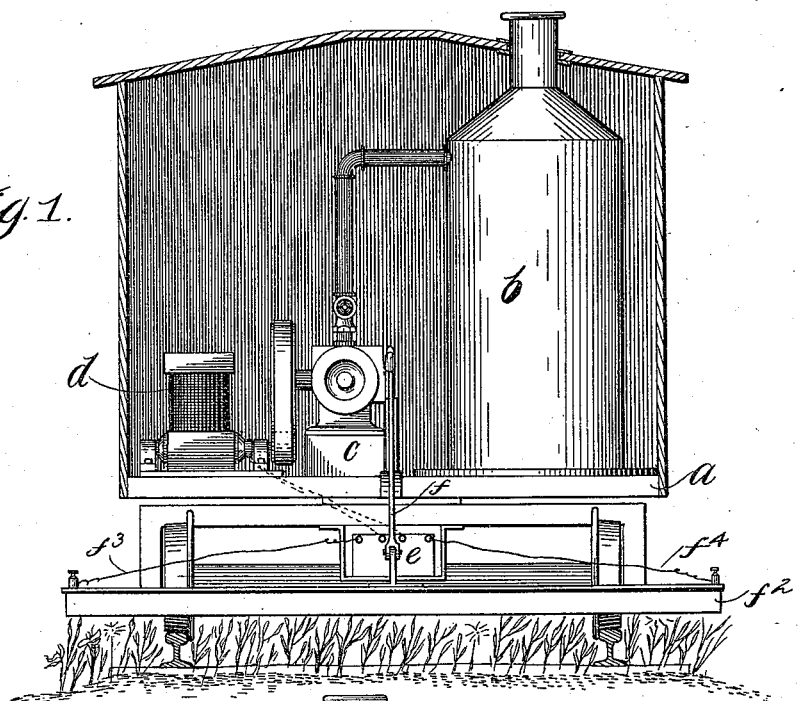

(No Model.) 2 Sheets—Sheet 1.

A. SCHEIBLE.
APPARATUS FOR EXTERMINATING VEGETATION.

No. 546,682. Patented Sept. 24, 1895.

Witnesses:
George L. Cragg
De Witt C. Tanner

Inventor:
Albert Scheible.
By W. Clyde Jones
Attorney.

(No Model.) 2 Sheets—Sheet 2.

A. SCHEIBLE.
APPARATUS FOR EXTERMINATING VEGETATION.

No. 546,682. Patented Sept. 24, 1895.

Witnesses:
George L. Cragg.
De Witt C. Tanner.

Inventor:
Albert Scheible.
By W. Clyde Jones.
Attorney.

UNITED STATES PATENT OFFICE.

ALBERT SCHEIBLE, OF CHICAGO, ILLINOIS.

APPARATUS FOR EXTERMINATING VEGETATION.

SPECIFICATION forming part of Letters Patent No. 546,682, dated September 24, 1895.

Application filed January 22, 1895. Serial No. 535,761. (No model.)

*To all whom it may concern:*

Be it known that I, ALBERT SCHEIBLE, a citizen of the United States, residing at Chicago, in the county of Cook and State of Illinois, have invented certain new and useful Improvements in Apparatus for Exterminating Vegetation, (Case No. 1,) of which the following is a full, clear, concise, and exact description, reference being had to the accompanying drawings, forming a part of this specification.

My invention relates to apparatus for exterminating vegetation by passing a current of electricity through the stalks and roots of the plants, my object being to provide effective means for insuring the passage of the current through the vital portions of the plant; further, to more thoroughly and safely insulate the current-carrying conductors and to provide means whereby overloads or excessive strains on the electrical generator may be avoided. It has been proposed heretofore to pass a brush or electrode connected with one pole of a generator over the vegetation in contact with the foliage, the opposite pole of the generator being connected with the rails upon which the vehicle carrying the brush is adapted to travel, the current thus passing from the brush to the foliage of the vegetation, through the stalks and roots to the ground, returning to the generator through the rails and wheels of the vehicle. In Letters Patent No. 492,635, granted February 28, 1893, to Albert A. Sharp, is disclosed apparatus embodying the above-mentioned features. The current necessary to be employed is of very high voltage, usually from ten thousand to twenty thousand volts, and a difficulty heretofore encountered has been the jumping of the current from the foliage of the vegetation directly to the rail instead of passing through the stalks and roots of the plants to ground and then to the rail. Two difficulties thus arise: In the first place, the spark causes a destruction of the rail, overloads or short-circuits the generator, and strains the electrical equipment. In the second place the current does not pass through the roots of the plants and in consequence they are not permanenly destroyed. In order that the current may be effective in killing the vegetation the current must be passed through the roots, as otherwise the vegetation will spring up again though the foliage and stalks have been destroyed. The above difficulties arise particularly in dry weather and in dry climates, the wooden ties upon which the rails rest setting above the ground and being very dry, whereby the rail becomes practically insulated from the ground and the current finds a path of less resistance from the foliage directly to the rail. Furthermore, the dry surface of the ground is a very poor conductor of electricity, and even though the rails rest in contact with the ground the same high resistance to the passage of the current exists, with the consequent production of sparks between the foliage and the rails.

In accordance with my invention a pair of brushes or electrodes are provided, connected, respectively, with the opposite poles of the generator, the electrodes being moved over the vegetation in contact with the foliage, whereby the current passes from one electrode to the foliage of the plants in contact with the electrode, through the stalks and roots thereof to ground, then through the ground to the roots of the plants with which the second electrode makes contact, the current then passing through the stalks and foliage of such plants to the second electrode. The electrodes are carried such a distance apart that the current cannot arc across from one electrode to the other, following the foliage of the plants, but must pass to earth through the stalks and roots of the plants in contact with one electrode and back through the roots and stalks of the plants in contact with the other electrode. The current thus finds a path through the roots of the first plants to the moist earth lying at a distance below the surface, passing through the moist earth to the roots of the second set of plants, the path thus afforded being one of minimum resistance, and the necessity of the passage of the current through the dry and poor-conducting earth lying at the surface is entirely avoided. The two brushes or electrodes are insulated from the frame of the machine, thus avoiding the tendency of leaks in the apparatus and the danger of shocks to the attendant consequent upon connecting one terminal of the generator to the frame of the vehicle, as has been done heretofore. In order to distribute the load and balance the variations in strain due to the irregular distribution of the vegetation along the path of the electrodes, I provide instead of a single pair a number of pairs of electrodes connected with the generator.

I will describe my invention more in detail by reference to the accompanying drawings, in which—

Figure 2:
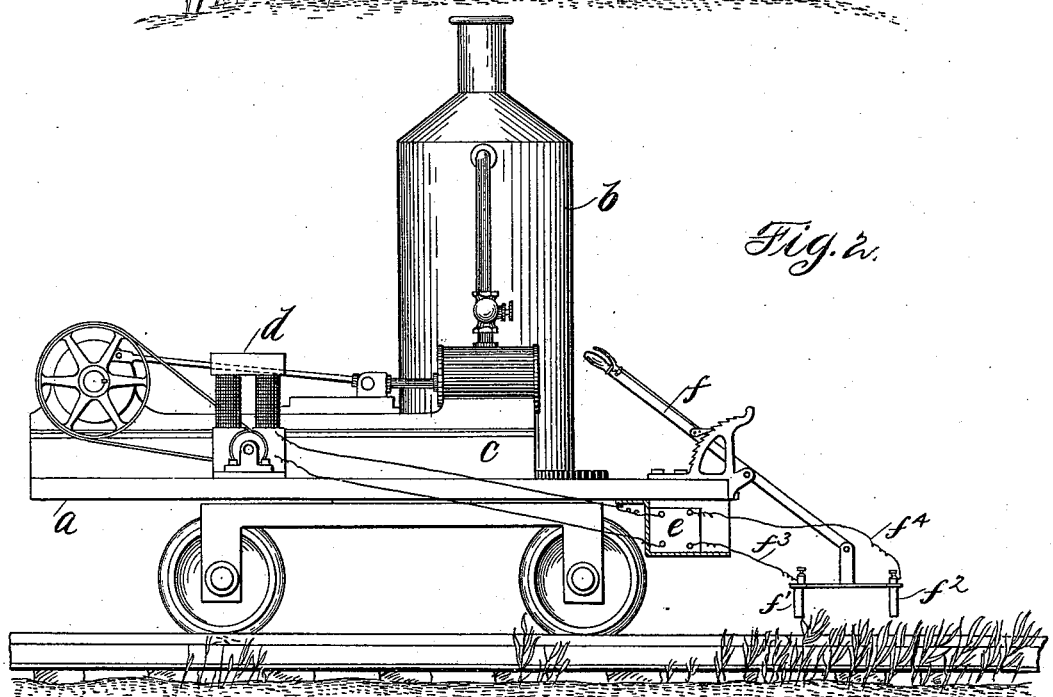
Figure 3:
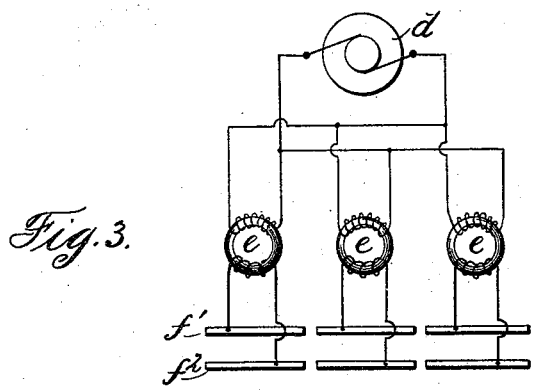
Figure 4:
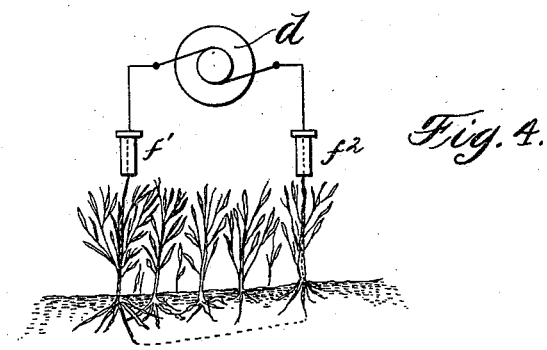
Figure 5:
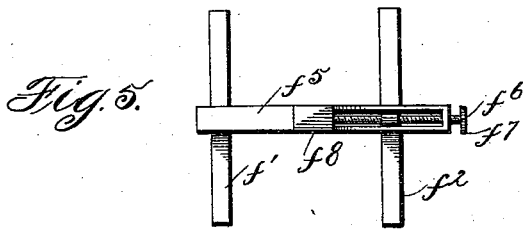

Figure 1 is a front view of a vehicle equipped with apparatus embodying my invention. Fig. 2 is a side view thereof. Fig. 3 is a view illustrating the manner of connecting the electrodes in circuit when more than one pair are employed. Fig. 4 is a diagram illustrating the path of the current through the vegetation. Fig. 5 is a plan view of the frame carrying the electrodes, illustrating the manner of adjusting the electrodes as to distance apart.

Like letters refer to like parts throughout the several figures.

I have illustrated my invention in connection with a vehicle adapted to travel along a railway-track; but it is applicable to vehicles traveling directly over the ground, as will be hereinafter explained. Upon the car $a$ are provided a boiler $b$ and engine $c$, adapted to drive the generator $d$, which may be an alternating-current generator, delivering a current of one thousand to two thousand volts. Upon the car, preferably in front and beneath the floor, is provided a step-up transformer $e$ for transforming the current to a voltage of ten thousand to twenty thousand volts, as may be required. The voltage employed will depend on the nature and density of the vegetation, the dryness of the plants and the soil, and the speed at which the terminals are passed over the plants. Upon a pivoted bar or lever $f$ are supported two bars or electrodes $f'$ $f^2$, extending transversely of the track and of a length to extend some distance beyond the rails at each side. The electrodes are connected by suitable conductors $f^3$ $f^4$ with the opposite poles of the transformer $e$. By thus placing the transformer at the end of the car the conductors carrying the transformed higher voltage currents will not pass the attendant stationed on the car, thus lessening the danger to him from contact with the wires. Instead of generating the current upon the car, means may be provided for conducting the current to the car by trolley devices, as circumstances will permit. The lever $f$ may be rotated about its pivot to adjust the electrodes $f'$ $f^2$ in height to suit the varying height of the vegetation, and also to clear any obstacles in the path of the vehicle. In order to adjust the distance between the electrodes, one of the electrodes, as $f'$, may be mounted to slide upon the cross-piece $f^5$, a screw $f^6$, provided with a handle $f^7$, being adapted to engage the frame upon which the electrode is supported and to rest by its end in a block $f^8$, mounted upon the cross-piece $f^5$. By turning the handle in one direction or the other the electrode $f'$ may be moved toward or from the electrode $f^2$. As the car advances, the electrodes make contact with the tops of the plants along the roadway, the current passing down one set of plants and up another set. The path of the current is illustrated diagrammatically in Fig. 4.

Instead of extending across the path of the vehicle the electrodes may be placed at the side, or may occupy any other position, as circumstances may require. In practice I prefer to arrange the electrodes in sections, providing a number of pairs of electrodes, as shown in Fig. 3, each pair being connected with a separate transformer, the transformers being connected with the generator in multiple. By this arrangement the load on the generator is rendered more uniform, as the current finds a path through a second pair of electrodes, when, for any reason, as the presence of a bare spot along the pathway, another pair of electrodes is thrown on open circuit. Furthermore, this arrangement permits the disconnection of one pair of electrodes, when broken or disabled, without stopping the operation of the machine.

When it is desired to exterminate vegetation at a distance from the track or in a field, conductors may be carried to a pair of electrodes adapted to be moved over the foliage of the vegetation by hand or by means of a vehicle upon which the electrodes are supported.

Having thus described my invention, what I claim as new, and desire to secure by Letters Patent, is—

1. In a vegetation exterminator, the combination with a source of electricity, of electrodes connected respectively with the opposite sides thereof and forming terminals adapted to be moved over the vegetation in electrical contact therewith, whereby the current flowing from one electrode to the other is caused to pass through the stalks and roots of two sets of plants in series; substantially as described.

2. In a vegetation exterminator, the combination with a source of electricity, of electrodes connected respectively with the opposite sides thereof, and adapted to make electrical contact with the vegetation, and means for moving said electrodes closer together or farther apart to change the resistance of the path between the two electrodes through the plants, substantially as described.

3. In a vegetation exterminator, the combination with a source of electricity, of electrodes connected respectively with the opposite sides thereof, and adapted to make electrical contact with the vegetation, said electrodes being arranged in sections, whereby the load is distributed.

In witness whereof I hereunto subscribe my name this 14th day of January, 1895.

ALBERT SCHEIBLE.

Witnesses:
W. CLYDE JONES,
GEORGE L. CRAGG.